(12) United States Patent
Conway et al.

(10) Patent No.: US 7,137,606 B2
(45) Date of Patent: Nov. 21, 2006

(54) ADJUSTABLE CHANNEL-MOUNT SIGN MOUNTING SYSTEM

(75) Inventors: Thomas M. Conway, Park Ridge, IL (US); Scott Padiak, Skokie, IL (US); Paul C. Evans, Chicago, IL (US)

(73) Assignee: Cormark, Inc., Des Plaines, IL (US)

( * ) Notice: Subject to any disclaimer, the term of this patent is extended or adjusted under 35 U.S.C. 154(b) by 230 days.

(21) Appl. No.: 10/858,940

(22) Filed: Jun. 2, 2004

(65) Prior Publication Data

US 2005/0269466 A1     Dec. 8, 2005

(51) Int. Cl.
*E04G 3/00* (2006.01)

(52) U.S. Cl. ............... 248/291.1; 248/291.1; 248/292.13; 248/284.1; 248/220.22

(58) Field of Classification Search ............ 248/291.1, 248/292.13, 284.1, 220.22, 222.52, 316.2, 248/222.14; 40/642.02, 649, 651, 492, 661.03, 40/611.06
See application file for complete search history.

(56) References Cited

U.S. PATENT DOCUMENTS

| | | | | |
|---|---|---|---|---|
| 2,409,814 A | * | 10/1946 | Vargish | ................ 40/745 |
| 4,113,109 A | * | 9/1978 | Donnelli et al. | ........... 211/49.1 |
| 4,531,311 A | * | 7/1985 | Howard et al. | ............... 40/649 |
| 5,044,104 A | * | 9/1991 | Hopperdietzel | .......... 40/654.01 |
| 5,815,970 A | * | 10/1998 | Thalenfeld et al. | ...... 40/642.01 |
| 5,826,359 A | * | 10/1998 | Thalenfeld et al. | ...... 40/642.01 |
| 5,934,633 A | * | 8/1999 | Padiak et al. | ............ 248/228.8 |
| 5,979,674 A | * | 11/1999 | Thalenfeld | ................. 211/57.1 |
| 6,484,988 B1 | * | 11/2002 | Conway et al. | ........ 248/289.11 |
| 2001/0005002 A1 | * | 6/2001 | Berman et al. | .......... 248/316.2 |

* cited by examiner

*Primary Examiner*—Anita King
*Assistant Examiner*—Michael McDuffie
(74) *Attorney, Agent, or Firm*—Welsh & Katz, Ltd.

(57) ABSTRACT

An adjustable, channel-mount system for mounting a sign to a shelf includes a spring-loaded mounting bracket having a mounting portion moveably connected to a sign-holding portion and an elongated sign-holder. The sign-holding portion of the mounting bracket features at least one channel. At least one securing element configured for engagement with the at least one channel of the sign-holding portion of the mounting bracket is included on a back surface of the sign-holder.

31 Claims, 3 Drawing Sheets

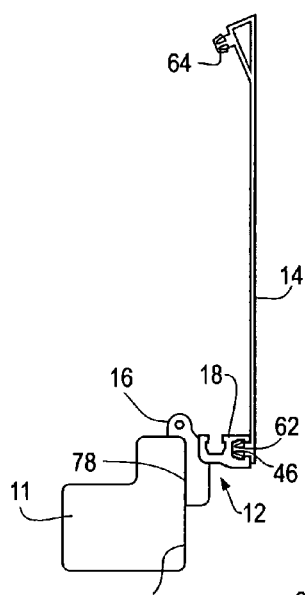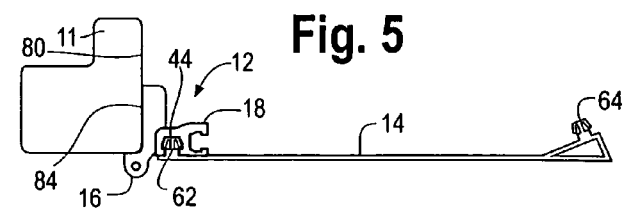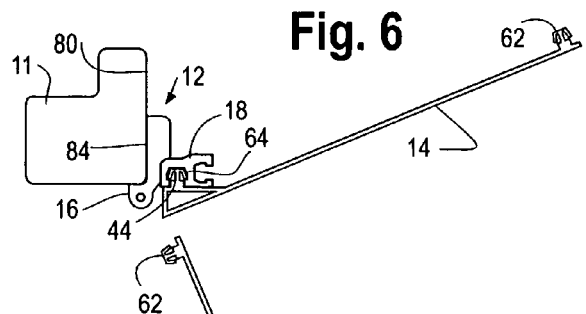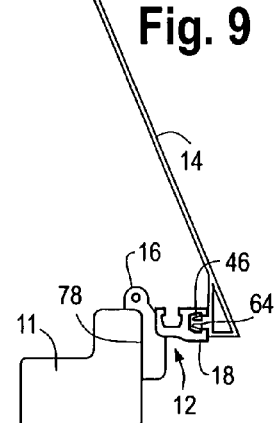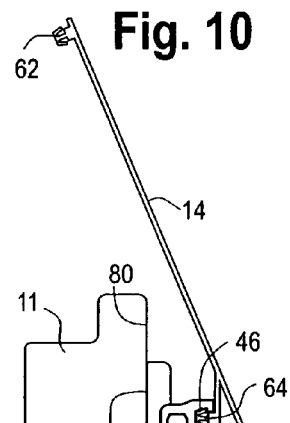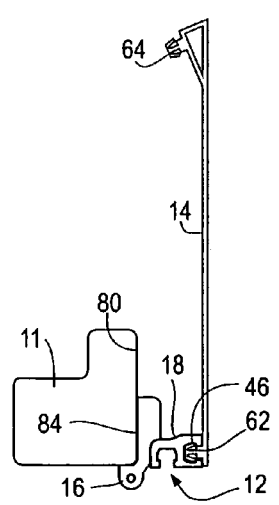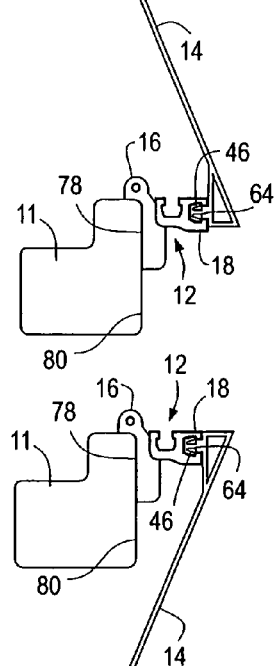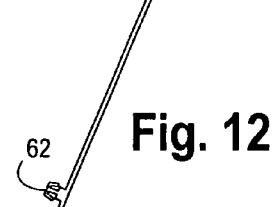

ADJUSTABLE CHANNEL-MOUNT SIGN MOUNTING SYSTEM

BACKGROUND OF THE INVENTION

The present invention is directed to a sign mounting system. More particularly, the invention pertains to an adjustable, channel-mount sign mounting bracket and a frameless sign holder for mounting to the bracket.

Consumers would readily recognize hundreds of different types of signs and sign systems used in retail settings. Signs and their mounts are available in a wide array of sizes, designs, and mounting arrangements. Typically, traditional stationary signs are mounted to support structures such as shelving, or from a vertical support element such as a shelf standard at the rear of shelves, or to vertical standards at the front of shelves. Such signs provide readily visible signage to direct consumers to merchandise stocked on the shelves.

While the signs are quite effective in directing a consumer's attention to a particular location, item, or product, because the signs must be mounted to shelf beams in particular, pre-determined ways, merchants have little flexibility in designing displays. A sign configured to be mounted to the top side of a shelf beam as a header cannot also attach to the bottom or front sides of the same beam for use as a shelf edge. To use both header and edge signs in their displays, merchants must stock multiple forms of signs or sign-holders, each with different means of mounting to the shelves' beams.

Signs require ready installation, to allow for simple display design changes. Many known sign mounting systems are permanent installations, so that removing and relocating the mounting systems is complicated, if not impossible. Many known signs and sign-holders are attached to their mounts via screws, hinges, or other mechanical elements. Even if these signs and sign-holders can be relocated to other sites, the additional elements increase the overall cost of the signs as well as the labor required to mount them effectively.

Many sign mounting systems are too large and cumbersome to fit in between the wires of the wire decking grids popular with many warehouses and warehouse stores. Instead, these signs must be placed to the side or in another, less immediate location. Another type of sign mounting system rigidly attaches a sign's body to a support structure. Such a rigid sign mount cannot readily absorb impacts, such as may occur when the sign is accidentally struck by a consumer, resulting in signage breaks or bends. Rigid sign mounts further cannot lift up or flex down to allow consumers better access to displayed products.

Accordingly, there exists a need for an adjustable sign mounting system that readily attaches to both the top sides of shelf beams as a header and the bottom and front sides of the same beams as a shelf edge. Desirably, such a sign mounting system is spring-loaded and can be used with any of a variety of types of retail display arrangements (e.g. overstock shelving, pallet rack shelving, and the like). Most desirably, the signs or sign-holders are interchangeable and engage directly with their mounts, without the use of mechanical elements.

BRIEF SUMMARY OF THE INVENTION

An adjustable system for mounting signs to shelf beams includes a spring-loaded mounting bracket and an elongated, interchangeable sign-holder. The mounting bracket incorporates a mounting portion and a sign-holding portion, which are moveably connected to each other. The sign-holding portion has at least one channel. The sign-holder has at least one securing element located on its back surface, which is configured for engagement with the at least one channel of the sign-holding portion of the mounting bracket.

In a preferred embodiment, the mounting portion and sign-holding portion of the mounting bracket are moveably connected to each other with a pin. Preferably, a spring also is mounted on the pin.

In the preferred embodiment, the mounting portion of the mounting bracket has a main body section and arms. The main body section includes an opening for operatively attaching the mounting portion to a shelf beam. The arms are moveably connected to the sign-holding portion of the mounting bracket. The mounting portion's main body section opening preferably is circular-shaped.

In the preferred embodiment, the at least one channel of the sign-holding portion of the mounting bracket has a substantially c-shaped cross-section. Preferably, the c-shaped channel has a base and two walls with curved edges, so that the edges narrow the channel to form an outer strait with parallel walls. Most preferably, the sign-holding portion of the mounting bracket includes two channels with substantially c-shaped cross-sections and curved edges narrowing the channels to form outer straits with parallel walls. The two channels most preferably are oriented perpendicularly to each other.

In the preferred embodiment, the at least one securing element extends along the entire length of the sign-holder's back surface. The securing element preferably includes an elongated, arcuate head segment mounted on a narrow, elongated stem segment that is fixed in an elongated base segment. Most preferably, two securing elements extend along the entire length of the sign-holder's back surface. One element may be placed on an upper portion of the sign-holder's back surface, and the other element may be located on a lower portion of the sign-holder's back surface. Elements may be attached directly to the back surface of the sign-holder, forming a projection that is perpendicular with respect to the back surface of the sign-holder. Alternately, they may be attached to a side of a right-triangle formed of and protruding from the back surface of the sign-holder, forming a projection that is at an acute angle with respect to the back surface of the sign-holder.

The at least one securing element may engage the at least one channel of the sign-holding portion of the mounting bracket by sliding into a side of the at least one channel, or by snapping into the at least one channel. Alternate modes of engagement, as known in the art, also are acceptable.

The system's mounting bracket may be attached to top, bottom, or front faces of the shelf beam. The shelf beam's front face includes upper and lower portions for mounting bracket attachment.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein:

FIG. 4 is a side view illustrating an alternate configuration of the adjustable, channel-mount sign mounting system of the present invention, shown attached to an upper portion of a front face of an exemplary shelf beam;

FIG. 5 is a side view illustrating an alternate configuration of the adjustable, channel-mount sign mounting system of the present invention, shown attached to a lower portion of a front face of an exemplary shelf beam;

FIG. 6 is a side view illustrating an alternate configuration of the adjustable, channel-mount sign mounting system of the present invention, shown attached to a lower portion of a front face of an exemplary shelf beam;

FIG. 7 is a side view illustrating an alternate configuration of the adjustable, channel-mount sign mounting system of the present invention, shown attached to a lower portion of a front face of an exemplary shelf beam;

FIG. 8 is a side view illustrating an alternate configuration of the adjustable, channel-mount sign mounting system of the present invention, shown attached to a lower portion of a front face of an exemplary shelf beam;

FIG. 9 is a side view illustrating an alternate configuration of the adjustable, channel-mount sign mounting system of the present invention, shown attached to an upper portion of a front face of an exemplary shelf beam;

FIG. 10 is a side view illustrating an alternate configuration of the adjustable, channel-mount sign mounting system of the present invention, shown attached to a lower portion of a front face of an exemplary shelf beam;

FIG. 11 is a side view illustrating an alternate configuration of the adjustable, channel-mount sign mounting system of the present invention, shown attached to an upper portion of a front face of an exemplary shelf beam; present invention, shown attached to a lower portion of a front face of an exemplary shelf beam;

FIG. 7 is a side view illustrating an alternate configuration of the adjustable, channel-mount sign mounting system of the present invention, shown attached to a lower portion of a front face of an exemplary shelf beam;

FIG. 8 is a side view illustrating an alternate configuration of the adjustable, channel-mount sign mounting system of the present invention, shown attached to a lower portion of a front face of an exemplary shelf beam;

FIG. 9 is a side view illustrating an alternate configuration of the adjustable, channel-mount sign mounting system of the present invention, shown attached to an upper portion of a front face of an exemplary shelf beam;

FIG. 10 is a side view illustrating an alternate configuration of the adjustable, channel-mount sign mounting system of the present invention, shown attached to a lower portion of a front face of an exemplary shelf beam;

FIG. 11 is a side view illustrating an alternate configuration of the adjustable, channel-mount sign mounting system of the present invention, shown attached to an upper portion of a front face of an exemplary shelf beam;

FIG. 12 is a side view illustrating an alternate configuration of the adjustable, channel-mount sign mounting system of the present invention, shown attached to a lower portion of a front face of an exemplary shelf beam;

DETAILED DESCRIPTION OF THE INVENTION

Figure 1:
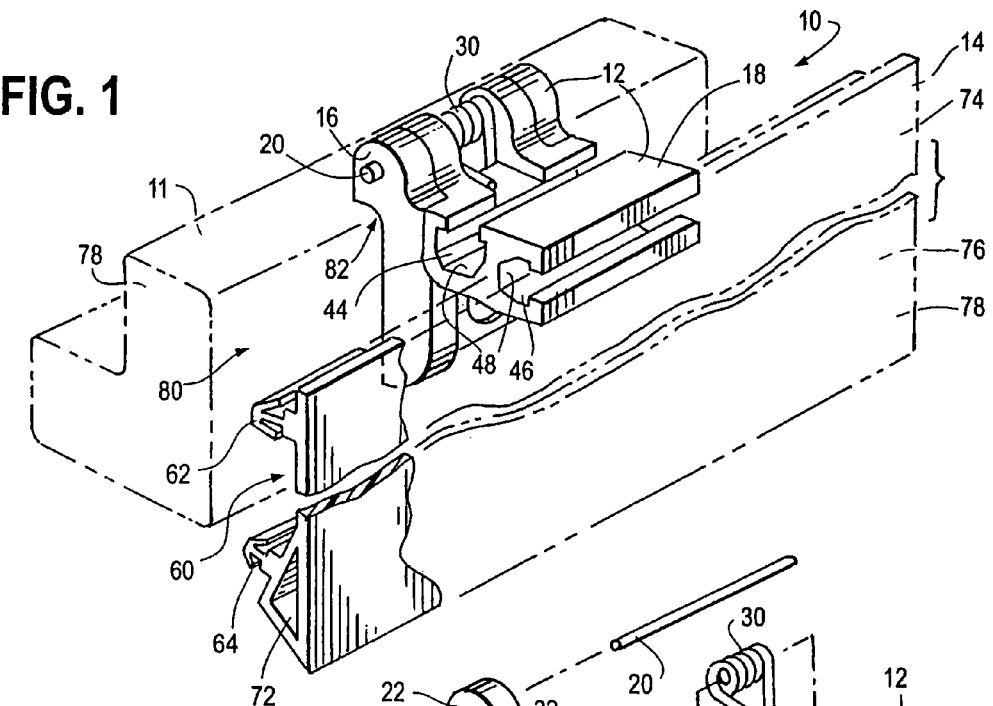
FIG. 1 is a perspective view of one configuration of one embodiment of an adjustable, channel-mount sign mounting system embodying the principles of the present invention, the sign mounting system shown attached to an upper portion of a front face of an exemplary shelf beam.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Referring to the figures and in particular FIG. 1, there is shown an adjustable, channel-mount sign mounting system 10 in accordance with the principles of the present invention. FIGS. 1 and 3–16 illustrate the sign mounting system 10 mounted to an exemplary shelf beam 11. The sign mounting system 10 includes a mounting bracket 12 and a sign-holder 14. Both the mounting bracket 12 and the sign-holder 14 may be injection molded. The mounting bracket 12 includes a mounting portion 16 and a sign-holding portion 18. The sign-holding portion 18 of the mounting bracket 12 incorporates at least one, but preferably two channels 44, 46. The channels 44, 46 are oriented perpendicular to each other, in the main body section 28 of the sign-holding portion 18. The channels 44, 46 have substantially c-shaped cross-sections, with bases 48 and walls 50 with curved edges 52 (see FIG. 3). The edges 52 of the walls 50 narrow the substantially c-shaped channels 44, 46 to form outer straits 54 with parallel walls 56.

Figure 2:
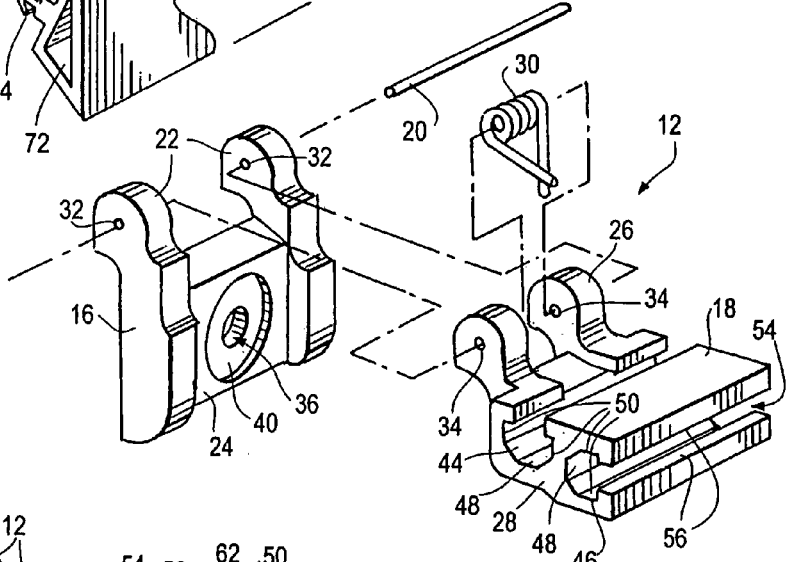
FIG. 2 is an exploded perspective view of a mounting bracket of the sign mounting system of FIG. 1.

The mounting portion 16 and sign-holding portion 18 of the mounting bracket are moveably connected to each other via a pin 20. FIG. 2 illustrates assembly of the mounting portion 16 and sign-holding portion 18 using the pin 20: two arms 22 extending from a main body section 24 of the mounting portion 16 surround two arms 26 extending from a main body section 28 of the sign-holding portion 18, which in turn surround a spring 30. The pin 20 passes through apertures 32, 34 located in each pair of arms 22, 26 and through the spring's 30 center.

Figure 3:
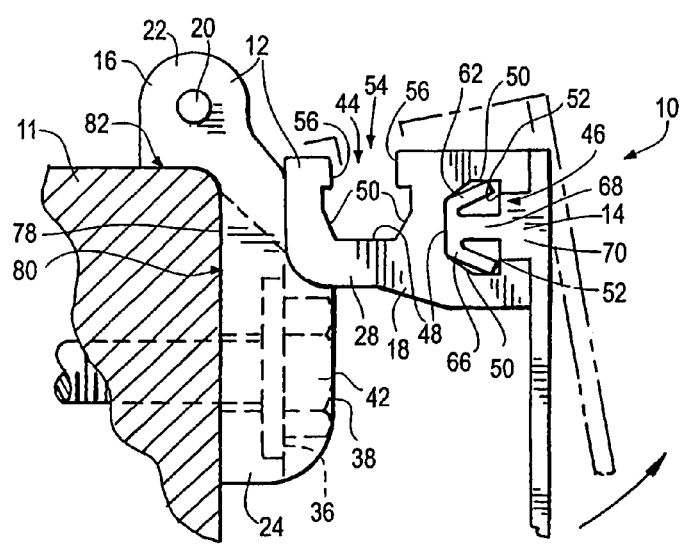
FIG. 3 is a cross-sectional view illustrating the attachment of the sign mounting system configuration of FIG. 1 to the shelf beam.

The main body section 24 of the mounting portion 16 of the mounting bracket 12 includes an opening 36 for operatively attaching the mounting portion 16 to a shelf beam 11 (FIG. 2). As shown in FIG. 3, the mounting bracket 12 may be attached to the shelf beam 11 with a bolt 38, although many other fasteners, such as screws, toggles, brads, nails, or tacks may be used. Preferably, the opening 36 is circular, and located at the center of a larger, circular depression 40. A head 42 of the bolt 38 securely fits into the depression 40, firmly anchoring the mounting bracket 12 to the shelf beam 11. Preferably, the mounting bracket 12 is sized to fit between the wire decking grids used with many shelves.

Referring now to FIGS. 1 and 3, the sign-holder 14 is shown coupled to the mounting bracket 12. The sign-holder 14 has front and back surfaces 58, 60, with at least one, but preferably two securing elements 62, 64 located on the back surface. Preferably, the securing elements 62, 64 extend along the entire length of the back surface 60 of the sign-holder 14. Most preferably, the securing elements 62, 64 include an elongated, arcuate head segment 66 atop a narrow, elongated stem segment 68, which is fixed in an elongated base segment 70. The head segment 66 is configured for engagement with either of the channels 44, 46 located in the main body section 28 of the sign-holding portion 18 of the mounting bracket 12. The head 66 may engage either of the channels 44, 46 by sliding into a side of the channel, or by snapping into the channel.

Preferably, the base segment 70 of a first one of the securing elements 62 is attached directly to the back surface 60 of the sign-holder 14, so that the head segment 66 forms a projection that is substantially perpendicular with respect to the plane of the back surface. The base segment 70 of the other, second securing element 64 then may be attached to a side of a right triangle 72 formed of and protruding from the back surface 60 of the sign-holder 14. The head segment 66 of this second securing element 64 therefore forms a projection that is at an acute angle with respect to the plane of the back surface 60. The first securing element 62 may be placed on an upper portion 74 of the sign-holder 14 with the second securing element 64 placed on a lower portion 76 of the sign-holder, or vice versa. The sign-holders 14 are available in a variety of colors and heights, and are interchangeable with one another, allowing merchants to easily switch signs in their displays.

Referring now to FIGS. 1 and 3–16, a variety of configurations are shown for attachment of the sign mounting system 10 to an exemplary shelf beam 11. In FIGS. 1 and 3, the mounting portion 16 of the mounting bracket 12 is attached to an upper portion of a front face 80 of the shelf beam 11. Preferably, the arms 22 of the mounting portion 16 are curved on their inside surfaces 82 to ensure a close fit with the shelf beam 11. The head segment 66 of the first securing element 62 is engaged with one of the channels 46 of the sign-holding portion 18 of the mounting bracket 12. This configuration provides a shelf edge that is substantially perpendicular to the shelf beam 11 and extends down. As FIG. 3 indicates, because the mounting bracket 12 is spring-loaded, the sign-holding portion 14 may flex upwards in response to bumps or jolts, without breaking.

FIGS. 4, 9, and 11 illustrate similar configurations to that of FIGS. 1 and 3, with variations in the securing element used or the channel engaged. In FIG. 4, the head segment of the first securing element 62 is again engaged with the same channel 46 as in FIGS. 1 and 3 to form a shelf edge, but the sign-holder 14 extends up, rather than down. The configuration of FIG. 4 also may be used as a header, such as on a high shelf, for labeling overstock. FIG. 9 features the same channel 46 engagement, but with the second securing element 64 instead, sign-holder 14 extending up. Use of the second securing element 64 creates an angled sign display, again suitable for a shelf edge or header. Similarly, FIG. 11 illustrates the same channel 46 engaged by the second securing element 64, but with the sign-holder 14 extending down at an angle.

FIGS. 5–8, 10, and 12 all show the mounting portion 16 of the mounting bracket 12 attached to a lower portion 84 of the front face 80 of the shelf beam 11. In FIGS. 7, 8, 10, and 12, the same channel 46 is used for engagement as in FIGS. 4, 9, and 11. In FIGS. 7 and 8, the first securing element 62 is engaged with the channel 46, the sign-holder 14 extending upwardly in FIG. 8 and downwardly in FIG. 7. In FIGS. 10 and 12, the second securing element 64 is engaged with the channel 46, the sign-holder 14 extending upwardly in FIG. 10 and downwardly in FIG. 12. In FIGS. 5 and 6, the other channel 44 is engaged with the first securing element 62 and the second securing element 64 respectively.

Figure 13:
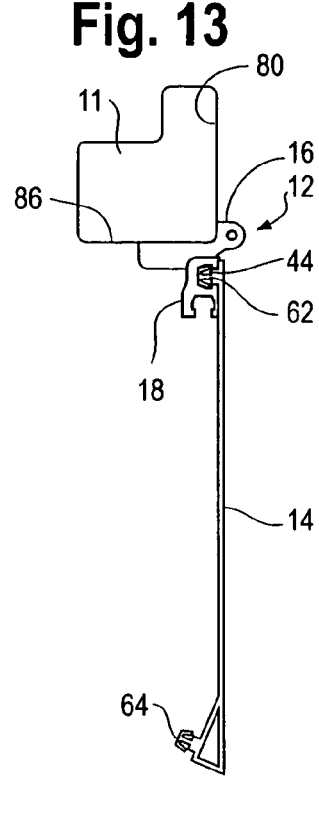
FIG. 13 is a side view illustrating an alternate configuration of the adjustable, channel-mount sign mounting system of the present invention, shown attached to a bottom face of an exemplary shelf beam.
Figure 15:
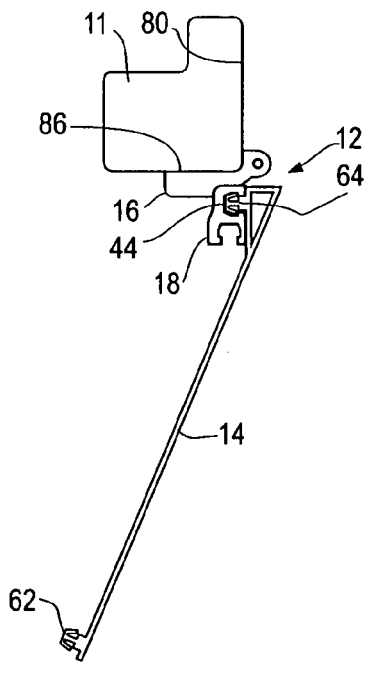
FIG. 15 is a side view illustrating an alternate configuration of the adjustable, channel-mount sign mounting system of the present invention, shown attached to a bottom face of an exemplary shelf beam.

In FIGS. 13 and 15, the mounting portion 16 of the mounting bracket 12 is shown attached to a bottom face 86 of the shelf beam 11. In both FIGS. 13 and 15, the channel 44 used for engagement is the same as in FIGS. 5 and 6. FIG. 13 shows the first securing element 62 engaged to the channel 44, so that the sign-holder 14 extends directly downward. FIG. 15 illustrates the second securing element 64 engaged to the channel 44, so that the sign-holder 14 extends downward at an acute angle to the shelf beam 11. Though these configurations could be used as headers, they are more likely to be used as shelf edges.

Figure 14:
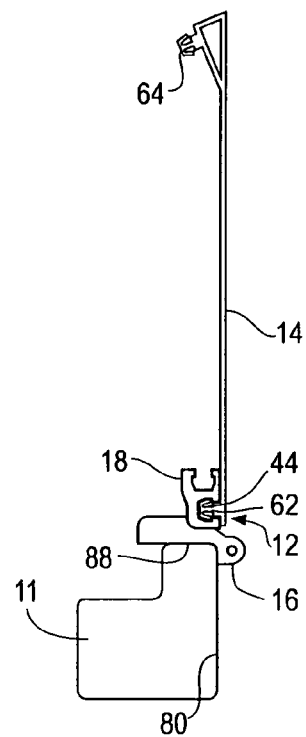
FIG. 14 is a side view illustrating an alternate configuration of the adjustable, channel-mount sign mounting system of the present invention, shown attached to a top face of an exemplary shelf beam.
Figure 16:
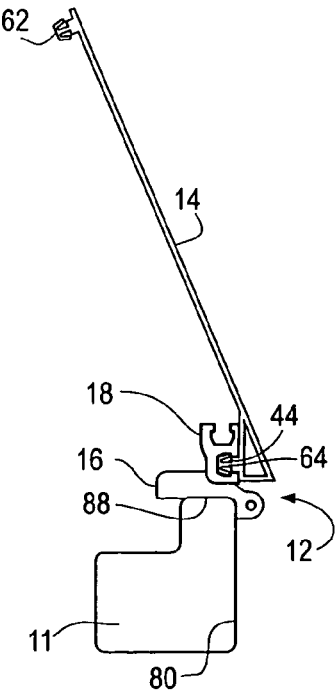
FIG. 16 is a side view illustrating an alternate configuration of the adjustable, channel-mount sign mounting system of the present invention, shown attached to a top face of an exemplary shelf beam.

FIGS. 14 and 16 demonstrate the mounting portion 16 of the mounting bracket 12 attached to a top face 88 of the shelf beam 11. Again, the channel 44 used for engagement is the same as in FIGS. 5 and 6. FIG. 14 depicts the first securing element 62 engaged to the channel 44, so that the sign-holder 14 extends directly upward. FIG. 16 illustrates the second securing element 64 engaged to the channel 44, so that the sign-holder extends upward at an acute angle to the shelf beam 11. Though these configurations could be used as shelf edges, they are more likely to be used as headers. As may be seen from the figures, either securing element 62, 64 may engage with either channel 44, 46.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. An adjustable, channel-mount system for mounting a sign to a shelf beam, comprising:
   a spring-loaded mounting bracket having a mounting portion moveably connected to a sign-holding portion, wherein the sign-holding portion includes at least one channel; and
   an elongated, interchangeable sign-holder having front and back surfaces, with at least one securing element located on the back surface of the sign-holder and configured for engagement with the at least one channel of the sign-holding portion of the mounting bracket;
   wherein the at least one securing element comprises a first securing element that is attached to a side of a triangle formed of and protruding from the back surface of the sign-holder, so that it forms a projection that is at an acute angle with respect to the back surface of the sign-holder.

2. The system of claim 1, wherein the mounting portion and sign-holding portion are moveably connected to each other with a pin.

3. The system of claim 2, wherein a spring is mounted on the pin.

4. The system of claim 1, wherein the mounting portion includes a main body section and arms, wherein the main body section includes an opening for operatively attaching the mounting portion to the shelf beam, and the arms are moveably connected to the sign-holding portion of the mounting bracket.

5. The system of claim 4, wherein the opening in the main body section of the mounting portion is circular-shaped.

6. The system of claim 1, wherein the sign-holding portion includes a main body section and arms, wherein the main body section includes the at least one channel, and the arms are moveably connected to the mounting portion of the mounting bracket.

7. The system of claim 1, wherein the at least one channel of the sign-holding portion has a substantially c-shaped cross-section.

8. The system of claim 7, wherein the at least one substantially c-shaped channel includes a base and two walls with edges, and the edges of the walls narrow the substantially c-shaped channel to form an outer strait with generally parallel walls.

9. The system of claim 1, wherein the sign-holding portion includes two channels.

10. The system of claim 9, wherein the two channels of the sign-holding portion have substantially c-shaped cross-sections.

11. The system of claim 10, wherein each of the two substantially c-shaped channels includes a base and two walls with edges, and the edges of the walls narrow the substantially c-shaped channels to form outer straits with generally parallel walls.

12. The system of claim 9, wherein the two channels of the sign-holding portion are oriented perpendicularly with respect to each other.

13. The system of claim 1, wherein the at least one securing element extends along the entire length of the back surface of the sign-holder.

14. The system of claim 1, wherein the at least one securing element includes an elongated, arcuate head segment mounted on a narrow, elongated stem segment that is fixed in an elongated base segment, and is configured for engagement with the at least one channel of the sign-holding portion of the mounting bracket.

15. The system of claim 14, wherein the elongated head of the at least one securing element engages the at least one channel of the sign-holding portion of the mounting bracket by sliding into a side of the at least one channel.

16. The system of claim 14, wherein the elongated head of the at least one securing element engages the at least one channel of the sign-holding portion of the mounting bracket by snapping into the at least one channel.

17. The system of claim 1, wherein the at least one securing element comprises a second securing element that is attached directly to the back surface of the sign-holder, forming a projection that is substantially perpendicular with respect to the back surface of the sign-holder.

18. The system of claim 1, wherein at least two securing elements are located on the back surface of the sign-holder.

19. The system of claim 18, wherein one of the at least two securing elements is placed on an upper portion of the sign-holder and another of the at least two securing elements is placed on a lower portion of the sign-holder.

20. The system of claim 18, wherein two of the at least two securing elements extend along the entire length of the back surface of the sign-holder.

21. The system of claim 1, wherein the mounting bracket is attached to an upper portion of a front face of the shelf beam.

22. The system of claim 1, wherein the mounting bracket is attached to a lower portion of a front face of the shelf beam.

23. The system of claim 1, wherein the mounting bracket is attached to a top face of the shelf beam.

24. The system of claim 1, wherein the mounting bracket is attached to a bottom face of the shelf beam.

25. An adjustable, channel-mount system for mounting a sign to a shelf beam, comprising:
   a spring-loaded mounting bracket having a mounting portion and a sign-holding portion, wherein the mounting portion has a main body section with an opening for operatively attaching the mounting portion to the shelf beam, and arms moveably connecting the mounting portion to the sign-holding portion, and wherein the sign-holding portion has a main body section with two channels having substantially c-shaped cross-sections and arms moveably connecting the sign-holding portion to the mounting portion; and
   an elongated, interchangeable sign-holder having front and back surfaces, with two securing elements extending along the entire length of the back surface of the sign-holder and configured for snapping or sliding engagement with the channels of the sign-holding portion of the mounting bracket,
   wherein each of the securing elements includes an elongated, arcuate head segment mounted on a narrow, elongated stem segment that is fixed in an elongated base segment, and wherein a first securing element is attached directly to the back surface of the sign-holder, forming a projection that is perpendicular with respect to the back surface of the sign-holder, and a second securing element is attached to a side of a right triangle formed on and protruding from the back surface of the sign-holder, so that it forms a projection that is at an acute angle with respect to the back surface of the sign-holder.

26. The system of claim 25, wherein each of the two substantially c-shaped channels includes a base and two walls with edges, and the edges of the walls narrow the substantially c-shaped channels to form outer straits with generally parallel walls.

27. The system of claim 25, wherein the two channels of the sign-holding portion are oriented perpendicularly with respect to each other.

28. The system of claim 25, wherein the mounting bracket is attached to an upper portion of a front face of the shelf beam.

29. The system of claim 25, wherein the mounting bracket is attached to a lower portion of a front face of the shelf beam.

30. The system of claim 25, wherein the mounting bracket is attached to a top face of the shelf beam.

31. The system of claim 25, wherein the mounting bracket is attached to a bottom face of the shelf beam.

* * * * *